United States Patent [19]

Sasaki et al.

[11] Patent Number: 5,064,916
[45] Date of Patent: Nov. 12, 1991

[54] ORGANOPOLYSILOXANE COMPOSITION FOR THE FORMATION OF A CURED RELEASE FILM

[75] Inventors: Shosaku Sasaki, Ichihara; Hiroshi Masaoka, Saitama, both of Japan

[73] Assignee: Toray Silicone Company, Ltd., Tokyo, Japan

[21] Appl. No.: 439,965

[22] Filed: Nov. 21, 1989

[30] Foreign Application Priority Data

Nov. 25, 1988 [JP] Japan ................................ 63-299301

[51] Int. Cl.$^5$ .......................................... C08F 283/00
[52] U.S. Cl. ...................................... 525/478; 528/15; 528/20; 528/12; 528/21; 528/31; 528/32; 524/315; 524/465; 524/588
[58] Field of Search ....................... 528/15, 20, 21, 12, 528/31, 32; 525/478; 524/588, 465, 315

[56] References Cited

U.S. PATENT DOCUMENTS

| | | | |
|---|---|---|---|
| 4,256,870 | 3/1981 | Eckberg | 528/15 |
| 4,347,346 | 8/1982 | Eckberg | 528/15 |
| 4,609,574 | 9/1986 | Keryk et al. | 427/407.1 |
| 4,946,878 | 8/1990 | Jensen et al. | 528/15 |

FOREIGN PATENT DOCUMENTS 1240520 7/1971 United Kingdom .

*Primary Examiner*—Melvyn I. Marquis
*Attorney, Agent, or Firm*—George A. Grindahl

[57] ABSTRACT

A curable organopolysiloxane composition comprising an organopolysiloxane gum having higher alkenyl groups, an organohydrogenpolysiloxane crosslinker, a solvent, a platinum group metal-containing catalyst and an inhibitor therefor provides for the formation of a tough, cured release film.

When this composition is coated on the surface of any of various types of substrates, for example, paper, synthetic resin films, fibers, etc., and then heated for 10 to 20 seconds at 80 to 90 degrees Centigrade, it forms a cured film which manifests an extremely stable release performance for tacky substances, such as, for example, pressure-sensitive adhesives, and the like, while at the same time evidencing an excellent adherence to the substrate itself.

The compositions can be used with synthetic resin films, such as polyolefin, which are easily deformed by heat and with poorly heat-tolerant paper.

9 Claims, No Drawings

ORGANOPOLYSILOXANE COMPOSITION FOR THE FORMATION OF A CURED RELEASE FILM

BACKGROUND OF THE INVENTION

The present invention relates to an organopolysiloxane composition for the formation of a cured release film, and, more particularly, relates to such a composition which rapidly forms a cured film at low temperatures and which develops a stable releaseability against tacky substances.

It has long been known that materials having releaseability from tacky substances, for example, from pressure-sensitive adhesives and the like, can be obtained by the formation of a cured release film on the surface of various types of substrates, for example, paper, synthetic resin films, and textiles made of synthetic fibers. Organopolysiloxane compositions have typically been used to form such cured release films. For example, Japanese Patent Publication Number 52-40918 (40,918/77) discloses an organopolysiloxane composition comprising vinyl-containing organopolysiloxane, organohydrogenpolysiloxane, and platinum-type compound, while Japanese Patent Application Laid Open (Kokai) Number 62-86061 (86,061/87) discloses an organopolysiloxane composition comprising platinum-type compound, organohydrogenpolysiloxane, and low-viscosity organopolysiloxane possessing higher alkenyl groups such as the hexenyl group.

However, the former organopolysiloxane composition has a slow curing rate, and, in order to bring about its curing in a short period of time, it becomes necessary to implement a high-temperature heat treatment on the level of at least 140 degrees Centigrade. This causes such problems as heat shrinkage and blistering in the substrate and also a decline in gloss by mirror-finished surfaces. In the case of the latter organopolysiloxane composition, while the curing rate is in fact rapid, the cured film nevertheless has a low strength because a low-viscosity organopolysiloxane is used as the main component. For example, when a release sheet based on this composition is rolled up, its surface is easily damaged. Also, when used on a porous substrate such as paper, it readily penetrates into the porous substrate, which results in the uptake of large quantities of the organopolysiloxane composition during coating with the concomitant cost penalty. Finally, its performance is not entirely satisfactory.

BRIEF SUMMARY OF THE INVENTION

The present inventors achieved the present invention as a consequence of investigations directed at solving the aforementioned problems.

The present invention takes as its object the introduction of an organopolysiloxane composition for the formation of a cured release film which both cures rapidly and cures to give a tough, strong release film.

This object, and other which will become apparent to one of ordinary skill in the organosilicone art, is obtained by the compositions of the present invention which, briefly stated, comprise an organopolysiloxane gum bearing at least two higher alkenyl radicals, an organohydrogenpolysiloxane crosslinker for the gum, a platinum group metal-containing compound, an inhibitor for the platinum group metal-containing compound and a solvent.

DETAILED DESCRIPTION OF THE INVENTION

The present invention relates to an organopolysiloxane composition for the formation of a cured release film, said composition comprising (A) 100 weight parts organopolysiloxane gum which contains in each molecule at least two higher alkenyl groups as represented by the general formula $H_2C=CH(CH_2-)_a$ wherein the subscript a has a value of from 2 to 8, (B) 0.3 to 40 weight parts organohydrogenpolysiloxane having at least two silicon-bonded hydrogen atoms in each molecule, (C) 0.001 to 5 weight parts addition-reaction inhibitor, (D) a catalytic quantity of a platinum group metal-containing compound, and (E) organic solvent in an arbitrary quantity.

To explain the preceding in greater detail, the organopolysiloxane constituting the component (A) used by the present invention is the major, i.e. principal, component of the composition of the present invention, and comprises an organopolysiloxane gum having in each molecule at least two higher alkenyl groups as represented by the general formula $H_2C=CH(CH_2-)_a$. The value of a in this formula is to be 2 through 8, and a range of 3 through 8 is preferred. When the value of a falls below 2, the composition of the present invention has a slow rate of cured-film formation. At beyond 8, it becomes difficult to obtain an organopolysiloxane gum during preparation of this organopolysiloxane.

This organopolysiloxane gum will generally have the same degree of polymerization, plasticity and fluidity as the organopolysiloxane gums used as base components for silicone rubbers. An organopolysiloxane gum is a slowly to non-flowing material having a viscosity of at least $10^6$ centipoise at 25° C. For polydimethylsiloxane gums this viscosity value corresponds to a plasticity number of approximately 75.

When the degree of polymerization of this organopolysiloxane gum is too low, the strength performance of the cured release film, for example, tensile strength, elongation, tear strength, abrasion resistance, etc., declines. A plasticity number of at least 100 as stipulated in JIS C 2123 is generally preferred for component (A). JIS C 2123 is substantially identical to ASTM 926-67, when a test temperature of at 23° C. and a test interval of 15 minutes is used. ASTM 926-67 is incorporated herein by reference to teach how to measure the plasticity of component (A).

This organopolysiloxane gum is exemplified by organopolysiloxane having the following average unit formula $R_bSiO_{(4-b)/2}$ and also having in each molecule at least two higher alkenyl groups as represented by the general formula $H_2C=CH(CH_2-)_a$.

The group R in this formula comprises substituted and unsubstituted monovalent hydrocarbon groups as exemplified by alkyl groups such as methyl, ethyl, propyl, and butyl; higher alkenyl groups as represented by the following general formula $H_2C=CH(CH_2-)_a$, wherein a=2 to 8; aryl groups such as phenyl, tolyl, and xylyl; aralkyl groups such as 2-phenylethyl, 2-phenylpropyl; and halogenated alkyl groups, such as 3,3,3-trifluoropropyl. It is preferred that methyl comprise at least 70 mole % of R from the standpoint of the obtained release properties. Furthermore, the subscript b is a number with a value of from 1.9 to 2.05. Finally, the organopolysiloxane gum under consideration may contain small quantities of the hydroxyl group or alkoxy groups.

The instant gum component is exemplified by triorganosiloxy-terminated dimethylsiloxane polymers, such as dimethylbutenylsiloxy-terminated dimethylpolysiloxanes, dimethylpentenylsiloxy-terminated dimethylpolysiloxanes, dimethylhexenylsiloxy-terminated dimethylpolysiloxanes, dimethylheptenylsiloxy-terminated dimethylpolysiloxanes, dimethyloctenylsiloxy-terminated dimethylpolysiloxanes, trimethylsiloxy-terminated methylbutenylsiloxane-dimethylsiloxane copolymers, trimethylsiloxy-terminated methylpentenylsiloxane-dimethylsiloxane copolymers, trimethylsiloxy-terminated methylhexenylsiloxane-dimethylsiloxane copolymers, trimethylsiloxy-terminated methylheptenylsiloxane-dimethylsiloxane copolymers, trimethylsiloxy-terminated methyloctenylsiloxane-dimethylsiloxane copolymers, dimethylpentenylsiloxy-terminated methylphenylsiloxane-dimethylsiloxane copolymers, dimethylhexenylsiloxy-terminated methylhexenylsiloxane-dimethylsiloxane copolymers, and dimethylhexenylsiloxy-terminated diphenylsiloxane-dimethylsiloxane copolymers; and silanol-terminated dimethylsiloxane polymers, such as silanol-terminated methylbutenylsiloxane-dimethylsiloxane copolymers, silanol-terminated methylhexenylsiloxane-dimethylsiloxane copolymers, silanol-terminated methylpentenylsiloxane-dimethylsiloxane copolymers.

The organohydrogenpolysiloxane comprising the component (B) used by the present invention is a crosslinker for component (A). In order to function as a crosslinker, it is necessary that at least two siliconbonded hydrogen atoms be present in each molecule. Such organohydrogenpolysiloxanes are exemplified as follows: dimethylhydrogensiloxy-terminated dimethylsiloxane-methylhydrogensiloxane copolymers, trimethylsiloxy-terminated dimethylsiloxane-methylhydrogensiloxane copolymers, dimethylphenylsiloxy-terminated dimethylsiloxane-methylhydrogensiloxane copolymers, trimethylsiloxy-terminated methylhydrogenpolysiloxanes, cyclic methylhydrogenpolysiloxanes, hydrogenpolysilsesquioxanes, and copolymers composed of dimethylhydrogensiloxane units and $SiO_2$ units.

This organohydrogenpolysiloxane component should be used at 0.3 to 40 weight parts per 100 weight parts component (A). A slow rate of curedfilm formation is encountered at below 0.3 weight parts, while the release performance of the cured film deteriorates in excess of 40 weight parts.

The addition-reaction inhibitor comprising the component (C) used by the present invention is required in order to impart storage or standing stability at room temperature to the composition of the present invention and can be any of the well-known inhibitors disclosed in the art relating to platinum-catalyzed curable silicone composition.

Examples here are alkynyl alcohols such as 3-methyl-1-butyne-3-ol, 3,5-dimethyl-1-hexyne-3-ol, 3-methyl-1-pentyne3-ol, phenylbutynol, etc.; as well as 3-methyl-3-pentene-1yne, 3,5-dimethyl-3-hexene-1-yne; tetramethylvinylsiloxane cyclics; benzotriazole, etc.

This inhibitor component should be added in a quantity which affords a practical pot life. Its reaction-inhibiting performance varies with molecular structure and the quantity of addition thus cannot be rigorously specified; however, the quantity of addition should fall within the range of 0.001 to 5 weight parts and preferably within the range of 0.05 to 1 weight parts for each 100 weight parts component (A).

The platinum group metal-containing compound comprising the component (D) used by the present invention is a catalyst for inducing crosslinking by component (B) and thus curing. Concrete examples of this component are microparticulate platinum adsorbed on a carbon particle carrier, chloroplatinic acid, alcohol-modified chloroplatinic acid, the olefin complexes of chloroplatinic acid, chloroplatinic acid/vinylsiloxane coordination compounds, platinum black, palladium-containing and rhodium-containing catalysts.

While the use quantity of this component cannot be rigorously specified because it varies with the species of compound, as a general matter it should fall within the interval of 1 to 1,000 ppm, based on the combined weight of components (A) and (B), in order to bring about formation of a cured film by heating the composition of the present invention to no more than 90 degrees Centigrade.

The organic solvent comprising the component (E) used by the present invention is necessary in order to improve the storage or standing stability of the composition of the present invention and also to improve the coatability on various substrates. To be useable within the present context, the organic solvent must uniformly dissolve the composition of the present invention. This solvent component is exemplified by aromatic hydrocarbons such as benzene, toluene, xylene, etc.; aliphatic hydrocarbons such as heptane, hexane, pentane, etc.; halogenated hydrocarbons such as trichloroethylene and perchloroethylene, etc.; as well as by ethyl acetate, methyl ethyl ketone, and the like.

The amount of solvent to use in the compositions of this invention is not critical and is merely that amount that will improve the storage or standing stability of the composition and/or improve the coatability of the compositions on various substrates and/or the preparation of the composition. From the standpoint of solvent-recovery requirements it is desirable to use as little solvent as is needed to obtain one or more of these results.

The composition of the present invention can be readily prepared simply by mixing the aforementioned components (A) through (E) to homogeneity. An advantageous method for the execution of this mixing is first to dissolve component (A) to homogeneity in component (E), and then to mix components (B), (C), and (E).

When the composition of the present invention, as described above, is coated on the surface of any of various types of substrates, for example, paper, synthetic resin films, fibers, etc., and then heated for 10 to 20 seconds at 80 to 90 degrees Centigrade, it forms a cured film which manifests an extremely stable release performance for tacky substances, such as, for example, pressure-sensitive adhesives, and the like, while at the same time evidencing an excellent adherence to the substrate itself. Accordingly, the composition of the present invention can be used, inter alia, with synthetic resin films, such as polyolefin, which are easily deformed by heat and with poorly heat-tolerant paper. Moreover, it is also possible to extend its utilization to release substrates where the cured film must be tough and strong.

The present invention will be explained in greater detail in the following through illustrative examples, which are not to be taken as limiting the claimed invention. In the examples, parts=weight parts, and the viscosity is the value measured at 25 degrees Centigrade.

Moreover, the various measurement values referenced in the examples were determined according to the following methods.

Pot Life

A 450 mL portion of the organopolysiloxane composition was placed in a 600 mL glass flask equipped with a condenser. This was allowed to stand with stirring at 25 degrees Centigrade, and the viscosity was measured at prescribed times.

Curing Index

The prescribed quantity of organopolysiloxane composition was coated on the surface of a film or sheet substrate. This was then heated in an air-circulation oven at the specified temperature, and the time until the formation of a completely cured film was determined.

Peeling Resistance

The prescribed quantity of organopolysiloxane composition was coated on the surface of a film or sheet substrate. A cured film was prepared by heating in an air-circulation oven at a prescribed temperature for a prescribed period of time. Then, either a solvent-based acrylic pressure-sensitive adhesive (Oribine BPS 5127 from Toyo Ink Mfg. Co., Limited) or an emulsion-based acrylic pressure-sensitive adhesive (Oribine BPW-3110H from Toyo Ink Mfg. Co., Limited) was heated on the surface of this cured film for 2 minutes at 100 degrees Centigrade. Backing paper (basis weight=55 g/m$^2$) was adhered on this treated surface, and a measurement specimen was prepared by aging for the specified time period at 25 degrees Centigrade under a load of 20 g/cm$^2$. A test specimen was prepared by cutting this measurement specimen to a width of 5 cm. Using a tensile tester, the backing paper was peeled at 180 degrees at a peel rate of 0.3 m/minute, and the force (g) required for separation was measured.

Residual Adhesion

A cured film of the organopolysiloxane composition was prepared on the surface of a substrate sheet by the same method as for the peeling resistance. Polyester tape (Nitto Electric Industrial Co., Limited, Polyester Tape 31B) was then adhered on this surface, followed by heating for 20 hours at 70 degrees Centigrade under a load of 20 g/cm$^2$. The tape was then peeled off and affixed to a stainless steel plate. The force (g) required to peel this tape at an angle of 180 degrees and a peel rate of 0.3 m/minute was measured, and the value reported is the percent referred to the force required to peel the reference (untreated) tape.

EXAMPLE 1

The following were dissolved in 1,995 parts toluene: 100 parts trimethylsiloxy-terminated methylpentenyl-siloxane-dimethylsiloxane copolymer gum (pentenyl group content=1.8 mole %), 5 parts trimethylsiloxy-terminated methylhydrogenpolysiloxane (viscosity=20 centipoise), and 0.9 parts 3,5-dimethyl-3-hexene-1-yne. An organopolysiloxane composition for the formation of a cured release film was then prepared by the addition to the preceding of a chloroplatinic acid/divinyl-tetramethyldisiloxane complex at 130 ppm as platinum, based on the total weight of organopolysiloxane. This composition was then coated at 0.7 g/cm$^2$ on the surface of mirror-finished polyethylene-laminated kraft paper, and the curing index was measured at 90 degrees Centigrade and 150 degrees Centigrade. Also, after heating for 15 seconds at 90 degrees Centigrade or 150 degrees Centigrade, the peeling resistance and residual adhesion of the obtained cured film were measured. These results are reported in TABLE 1 and TABLE 2. The pressure-sensitive adhesive used in measurement of the peeling resistance was a solvent-based acrylic pressure-sensitive adhesive (Oribine BPS 5127 from Toyo Ink Mfg. Co., Limited).

For comparison, an organopolysiloxane composition was prepared as above, but using a trimethylsiloxy-terminated dimethylsiloxane-methylvinylsiloxane copolymer gum (vinyl group content=1.8 mole %) in place of the aforementioned methylpentenylpolysiloxane gum. The curing index, peeling resistance, and residual adhesion were measured on this organopolysiloxane composition as above, and these measurement results are also reported in TABLES 1 and 2.

TABLE 1

| Composition | Curing Index (seconds) | |
| --- | --- | --- |
| | 90 degrees C. | 150 degrees C. |
| present invention | 15 | 3 |
| comparison example | 66 | 10 |

TABLE 2

| Composition | Curing temperature, 15 seconds at degrees Centigrade | Peeling resistance (g/5 cm) | | Residual adhesion (%) |
| --- | --- | --- | --- | --- |
| | | 1 day | 10 days | |
| present invention | 90 | 23 | 24 | 98 |
| | 150 | 22 | 24 | 98 |
| comparison example | 90 | 49 | 260 | 15 |
| | 150 | 24 | 25 | 97 |

EXAMPLE 2

The following were dissolved in 1,995 parts toluene: 100 parts trimethylsiloxy-terminated dimethylsiloxane-methylhexenylsiloxane copolymer gum (hexenyl group content=2.4 mole %), 5 parts trimethylsiloxy-terminated methylhydrogenpolysiloxane (viscosity=40 centipoise), and 0.7 parts 3-methyl-1-butyne-3-ol. An organopolysiloxane composition for the formation of a cured release film was then prepared by the addition to the preceding of chloroplatinic acid/divinyltetramethyldisiloxane complex at 150 ppm as platinum. This composition was subsequently introduced into a mold equipped with an outer frame on a teflon sheet, the toluene was removed at 60 degrees Centigrade, and a 3 mm-thick cured film was then prepared by heating for 15 seconds at 150 degrees Centigrade. The tensile strength and tensile elongation of this cured product were measured, and the obtained results are reported in TABLE 3.

In addition, the organopolysiloxane composition prepared as above was coated at 0.4 g/cm$^2$, as solids on the corona discharge-treated surface of a polypropylene film which had been corona discharge-treated on one surface. The curing index, peeling resistance, and residual adhesion were measured as in Example 1, and these results are reported in TABLE 4. An emulsion-based acrylic pressure-sensitive adhesive (Oribine BPW-3110H from Toyo Ink Mfg. Co., Limited) was used as the pressure-sensitive adhesive in the peeling resistance measurement.

For comparison, an organopolysiloxane composition for the formation of a cured release film was prepared as above, but using a trimethylsiloxy-terminated dimethylsiloxane-methylhexenylsiloxane copolymer oil (viscosity=1,000 centipoise, hexenyl group content=2.5 mole %) in place of the aforementioned methylhexenylpolysiloxane gum. A 3 mm-thick cured film was prepared from this composition as above, its tensile strength and tensile elongation were measured, and these results are also reported in TABLE 3.

TABLE 3

| Composition | Physical properties of the cured films | |
|---|---|---|
| | Tensile (kg/cm$^2$) | Elongation (%) |
| present invention | 12 | 200 |
| comparison example | 7 | 90 |

TABLE 4

| Composition | Curing index (seconds) | | Peeling resistance (g) | | Residual adhesion (%) |
|---|---|---|---|---|---|
| | 90 degrees Centigrade | 120 degrees Centigrade | 1 day | 10 days | |
| present invention | 14 | 4 | 23 | 21 | 98 |

EXAMPLE 3

The following were dissolved in 1,629 parts toluene: 100 parts silanol-terminated dimethylsiloxane-methyloctenylsiloxane-methylphenylsiloxane copolymer gum (octenyl group content=2.1 mole %, phenyl group content=5 mole %), 4 parts trimethylsiloxy-terminated methylhydrogenpolysiloxane (viscosity=5 centipoise), and 0.7 parts 3-methyl-1-butyne-3-ol. An organopolysiloxane composition for the formation of a cured release film was then prepared by the addition to the preceding of chloroplatinic acid/divinyltetramethyldisiloxane complex at 120 ppm as platinum.

The curing index, peeling resistance, and residual adhesion of this composition were measured as in Example 2, and the obtained results are reported in TABLE 5.

TABLE 5

| Composition | Curing index (seconds) | | Peeling resistance (g) | | Residual adhesion (%) |
|---|---|---|---|---|---|
| | 90 degrees Centigrade | 120 degrees Centigrade | 1 day | 10 days | |
| present invention | 12 | 3 | 31 | 30 | 90 |

EFFECTS OF THE INVENTION

The present invention's organopolysiloxane composition for the formation of a cured release film is characterized by a rapid curing rate and by curing to give a strong, tough cured release film.

That which is claimed is:

1. An organopolysiloxane composition for the formation of a cured release film, said composition comprising
   (A) 100 weight parts organopolysiloxane gum which contains in each molecule at least two higher alkenyl groups as represented by the general formula $H_2C=CH(CH_2-)_a$ wherein the subscript a has a value of from 2 to 8,
   (B) 0.3 to 40 weight parts organohydrogenpolysiloxane having at least two silicon-bonded hydrogen atoms in each molecule,
   (C) 0.001 to 5 weight parts addition-reaction inhibitor,
   (D) a catalytic quantity of a platinum group metal-containing compound, and
   (E) organic solvent in an arbitrary quantity.

2. An organopolysiloxane composition according to claim 1 wherein the value of the subscript a is 3 to 8, both inclusive.

3. An organopolysiloxane composition according to claim 1 wherein the component (A) has a plasticity number of at least 100.

4. An organopolysiloxane composition according to claim 1 wherein at least 70 mole % of the organic groups of component (A) are the methyl group.

5. An organopolysiloxane composition according to claim 4 wherein component (B) is a trimethylsiloxy-terminated methylhydrogenpolysiloxane and component (D) is a chloroplatinic acid/divinyltetramethyldisiloxane complex.

6. An organopolysiloxane composition according to claim 4 wherein component (A) is a trimethylsiloxy-terminated methylalkenylsiloxane-dimethylsiloxane copolymer wherein the alkenyl radical has the formula $H_2C=CH(CH_2-)_a$ wherein the subscript a has a value of from 3 to 8.

7. An organopolysiloxane composition according to claim 4 wherein component (A) is a silanol-terminated methylalkenylsiloxane-dimethylsiloxane copolymer wherein the alkenyl radical has the formula $H_2C=CH(CH_2-)_a$ wherein the subscript a has a value of from 3 to 8.

8. An organopolysiloxane composition according to claim 4 wherein component (A) is a dimethylalkenylsiloxy-terminated dimethylsiloxane polymer wherein the alkenyl radical has the formula $H_2C=CH(CH_2-)_a$ wherein the subscript a has a value of from 3 to 8.

9. An organopolysiloxane composition according to claim 4 wherein component (A) is a dimethylalkenylsiloxy-terminated methylalkenylsiloxane-dimethylsiloxane copolymer wherein the alkenyl radical has the formula $H_2C=CH(CH_2-)_a$ wherein the subscript a has a value of from 3 to 8.

* * * * *